United States Patent
Perdue et al.

(10) Patent No.: US 10,623,567 B1
(45) Date of Patent: Apr. 14, 2020

(54) FACILITATING AGENT MANAGEMENT OF CONSENT FOR A PARTY ASSOCIATED WITH MULTIPLE TELEPHONE NUMBERS

(71) Applicant: Noble Systems Corporation, Atlanta, GA (US)

(72) Inventors: Andy E. Perdue, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 7 days.

(21) Appl. No.: 15/961,079

(22) Filed: Apr. 24, 2018

Related U.S. Application Data

(63) Continuation of application No. 14/798,815, filed on Jul. 14, 2015, which is a continuation-in-part of
(Continued)

(51) Int. Cl.
*H04M 3/51* (2006.01)

(52) U.S. Cl.
CPC ....... *H04M 3/5158* (2013.01); *H04M 3/5133* (2013.01)

(58) Field of Classification Search
CPC ...... H04M 3/5158; H04M 3/38; H04M 15/66; H04M 2215/208; H04M 3/42365; H04M 3/5183; H04M 15/8033; H04M 2242/18; H04M 3/51; H04M 3/5191; H04M 3/42102; H04M 3/5232; H04M 3/42093; H04M 3/42374; H04M 1/663; H04M 3/2281; H04M 3/42221; H04M 3/5125; H04M 2203/2038; H04M 2203/6081; H04M 3/42323; H04L 12/585; H04L 51/12; H04L 65/1079
USPC ............ 379/266.07, 266.08, 265.09, 265.01, 379/265.02, 266.1, 265.05, 266.09, 379/265.11, 266.01, 266.02, 266.03,
(Continued)

(56) References Cited

U.S. PATENT DOCUMENTS

2003/0212566 A1* 11/2003 Fergusson ............ G06Q 30/018
 705/317
2003/0215078 A1* 11/2003 Brahm ................ H04M 3/4281
 379/211.02
(Continued)

OTHER PUBLICATIONS

U.S. Appl. No. 15/642,415 Office Action dated Nov. 14, 2018, UPSTO, 36 pages.
(Continued)

*Primary Examiner* — Ahmad F. Matar
*Assistant Examiner* — Kharye Pope

(57) ABSTRACT

Systems, methods, and computer readable medium are disclosed for facilitating management of consent related information for an agent in a contact center. Upon receiving a request from a party to modify consent for receiving future communications, the agent may select an icon on their computer to manage consent. In one embodiment, one or more telephone numbers and their associated consent status is displayed to the agent. The agent may modify the consent status for a telephone number associated with the party. In another embodiment, the agent may select an icon that modifies the consent related information to reflect that consent has been revoked for all numbers and channel types thereof associated with the party.

18 Claims, 10 Drawing Sheets

Related U.S. Application Data application No. 14/795,260, filed on Jul. 9, 2015, now Pat. No. 10,237,405.

(58) Field of Classification Search
USPC ... 379/266.06; 370/352, 356, 353, 354, 355, 370/357
See application file for complete search history.

(56) References Cited

U.S. PATENT DOCUMENTS

| | | | | |
|---|---|---|---|---|
| 2004/0109557 | A1* | 6/2004 | Lenard | H04M 3/42374 379/266.07 |
| 2004/0148506 | A1* | 7/2004 | Prince | H04M 3/38 713/176 |
| 2005/0074114 | A1* | 4/2005 | Fotta | H04M 3/5158 379/266.08 |
| 2006/0036487 | A1* | 2/2006 | Mann | G06Q 30/0236 705/14.36 |
| 2008/0159519 | A1* | 7/2008 | Lovric | H04M 3/5166 379/265.09 |
| 2009/0132664 | A1* | 5/2009 | Radenkovic | G06Q 10/107 709/206 |
| 2010/0080216 | A1* | 4/2010 | Croy | H04L 12/66 370/352 |
| 2012/0027197 | A1* | 2/2012 | Zgardovski | H04M 3/42365 379/266.07 |
| 2015/0242817 | A1* | 8/2015 | Srimushnam | G06Q 10/1053 705/319 |
| 2015/0256419 | A1* | 9/2015 | Lugiai | H04L 67/141 709/227 |
| 2015/0281452 | A1* | 10/2015 | Bohlin | H04M 3/523 379/266.07 |

OTHER PUBLICATIONS

U.S. Appl. No. 15/488,586, Office Action dated Oct. 15, 2018, USPTO, 11 pages.
U.S. Appl. No. 15/488,586, Notice of Allowance dated Nov. 8, 2018, USPTO, 5 pages.
Noble Systems Opening Brief, Federal Circuit Case 18-1847 for USPTO Appeal 2017-009426, Noble Systems, dated Jul. 23, 2018, 52 pages.
Order, Federal Circuit Case 18-1847 for USPTO Appeal 2017-009426, USPTO, dated Mar. 7, 2019, 2 pages.
Noble Systems Reply Brief, Federal Circuit Case 18-1847 for USPTO Appeal 2017-009426, Noble Systems, dated Sep. 25, 2018, 270 pages.
USPTO Reply Brief, Federal Circuit Case 18-1847 for USPTO Appeal 2017-009426, USPTO, dated Oct. 5, 2018. 43 pages.
U.S. Appl. No. 14/795,260 Office Action dated Dec. 13, 2017, 27 pages.
U.S. Appl. No. 14/795,260, Office Action dated Jun. 15, 2018, USPTO, 15 pages.
U.S. Appl. No. 14/795,260, Notice of Allowance dated Dec. 28, 2018, USPTO, 5 pages.
U.S. Appl. No. 15/642,415, Notice of Allowance, USPTO, dated Apr. 10, 2019, 11 pages.

* cited by examiner

Debt Collection Campaign

Account Information 405

Name: Jane Smith
Number/Type: 404-555-1212 | Home
Consent Status: Okay to Call
Address: 1234 Main St. Anywhere, US
Status: Past Due 30 days
Amount Due: $600.00
NOTES: Do not call at work under any circumstances.

401 402 403

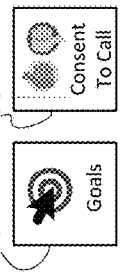

Queues | Goals | Consent To Call

410

Related Contact Information:

| Type 422 | Telephone Number 424 |
|---|---|
| Cell Phone | 404-512-1234 |
| Home | 404-555-1212 |
| Work | 404-632-0900 |
| Spouse Cell | 404 512-1256 |

*Operational Tips and Reminders*

Add a Contact Number

Number: _____

Number Type
- ☐ Cell
- ☐ Work
- ☐ Relative
- ☐ Other _____
- ☐ Home
- ☐ Spouse
- ☐ Alt. Home

Channel Type
- ☐ Voice   ☐ Text

Days of Week (Consent)

| Only | Never | Day |
|------|-------|-----|
| ☐ | ☐ | Sunday |
| ☐ | ☐ | Monday |
| ☐ | ☐ | Tuesday |
| ☐ | ☐ | Wednesday |
| ☐ | ☐ | Thursday |
| ☐ | ☐ | Friday |
| ☐ | ☐ | Saturday |

[Day of Week] ◁▷

Begin: 9:00 a.m.
End: 9:00 p.m.

FACILITATING AGENT MANAGEMENT OF CONSENT FOR A PARTY ASSOCIATED WITH MULTIPLE TELEPHONE NUMBERS

CROSS REFERENCE TO RELATED APPLICATIONS

This application is a continuation of U.S. patent application Ser. No. 14/798,815, filed on Jul. 14, 2015, which in turn is a continuation-in-part of U.S. patent application Ser. No. 14/795,260 filed on Jul. 9, 2015, the contents of both of which are incorporated by reference for all that they teach.

BACKGROUND

It is important in various contexts for a contact center agent to obtain or verify consent of an individual in regard to using certain equipment to dial a particular telephone number to reach that individual. This ensures that the contact center has authorization to contact the individual at a particular number when that individual needs to be reached. It is not unusual for an individual to have multiple telephone numbers that can be used to contact the individual. For example, a person may have a cell phone, work phone, home phone, alternative home phone, etc. The person may also provide their spouse's number or a relative's number as an alternative contact for some applications.

An agent may request consent from a party to receive calls placed to the current number or reconfirm such consent, but the agent may not always be aware that the party has other telephone numbers at which they can be reached. The call handling system used by the agent may have this information, but it may not be presented to the agent at the present time. Presenting these additional numbers to the agent during each call based on the mere possibility that the agent may need this information may be distracting to the agent.

Therefore, improved methods and procedures are required where additional information may be presented to the agent as to whether the person they are speaking with has other telephone numbers which they can be contacted at. Further, additional techniques are needed by which the agent can easily indicate to a consent management system whether the person has provided consent to be reached at these alternative telephone numbers.

Addressing this issue requires a consent management system that can properly detect when information related to additional contact information is potentially needed by the agent, and when to present such information to the agent. It is with respect to these and other considerations that the disclosure herein is presented.

BRIEF SUMMARY

In general, embodiments of the present invention provide computer program products, methods, systems, apparatus, and computing entities for facilitating management of consent related information by an agent in a contact center. In one embodiment, an agent on a call verbally interacts with the remote party during the call to obtain or update consent related information. Consent related information includes information related to authorization to contact that party, such as an authorized telephone number, channel (e.g., voice or text), or a time for reaching the party. A party may grant or reconfirm authorization or may revoke authorization. In one embodiment, a consent management module in a call handling system presents various consent related information and controls to the agent on the agent's computer to facilitate management of the consent information. This may allow the agent to easily update, modify, or otherwise enter consent information for that party.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale.

FIGS. 4A-4C illustrate various embodiments of a graphical user interface used by an agent to manage consent for a remote party during a call.

FIG. 5 illustrates one embodiment of a graphical user interface used by an agent to add a contact number associated with the remote party for which consent is provided.

FIG. 6 illustrates one embodiment of a graphical user interface used by an agent to modify consent information associated with the remote party.

DETAILED DESCRIPTION

Figure 1:
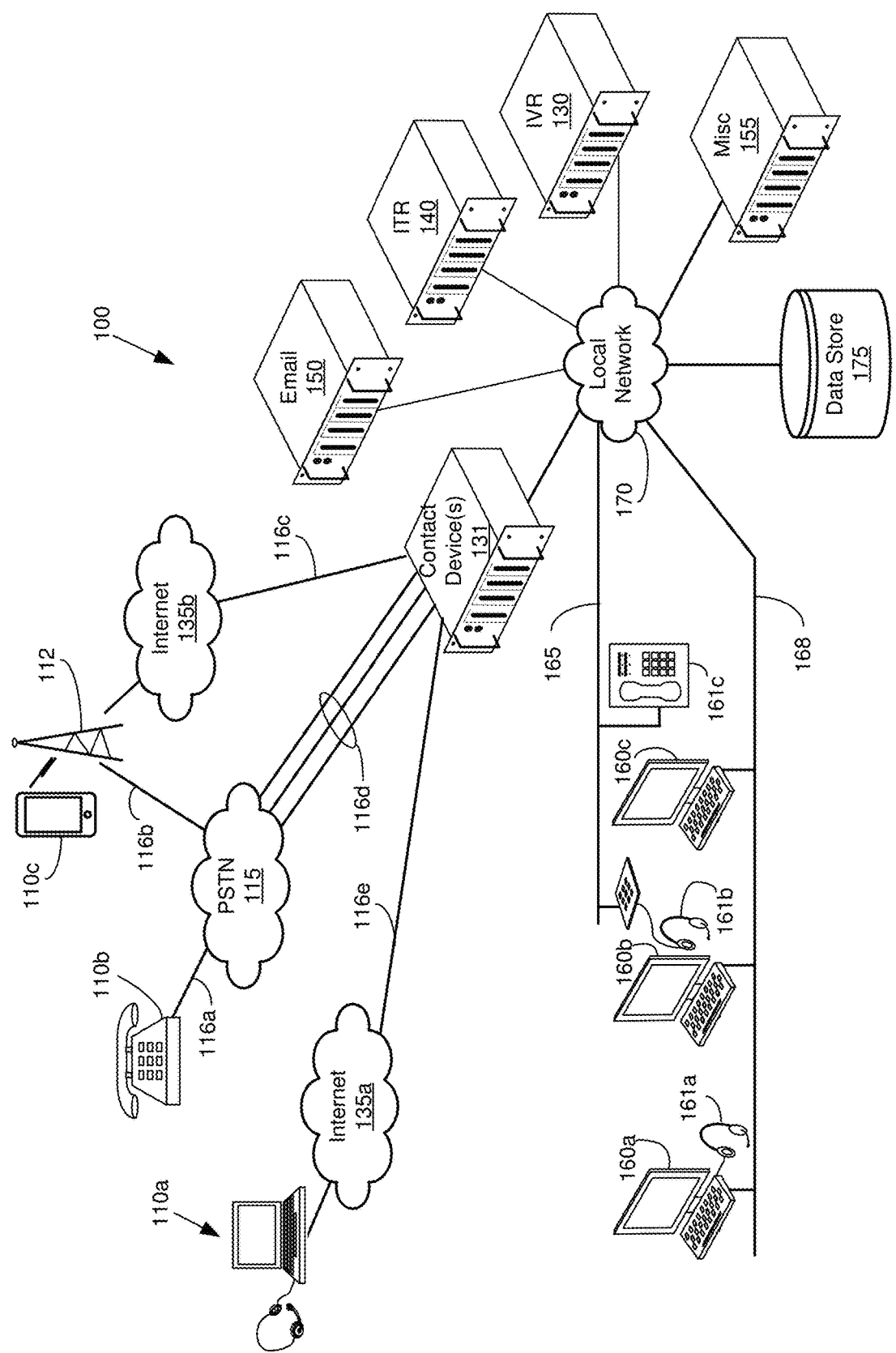
FIG. 1 illustrates a system architecture of a contact center that may be used to practice the concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. The principles of the invention are illustrated using contact center agents as employees, but the concepts and technologies disclosed herein could be applied to other types of employees and industries.

Glossary

The following terms are to be given the following meanings when used in the claims. Further, the terms defined herein are not necessarily applicable to any parent patent application(s) from which priority is claimed or which are incorporated by reference. To the extent there is any discrepancy of the meaning of a term defined herein and in a parent patent application, the term defined herein takes precedence over the definition in the parent patent application. Any examples included in a definition are not intended to be exclusive or limiting, but merely illustrative.

Agent—an employee or contractor of a contact center engaged to handle communications.

Call record—a data structure processed by a call handler in a contact center that provides information related to making an outbound communication.

Call Handler—a component in a contact center that processes communications. The communications may include communications that are inbound or outbound (relative to the contact center) and may encompass a variety of communication technologies. A call handler system frequently handles voice oriented calls, but may handle other types of communications.

Consent—an indication or information granting authorization to initiate communication. This is typically granted by a party with respect to being contacted by an outbound communication from a contact center. The consent may have a scope that is limited. For example, the consent may encompass authorizing certain types of communications, such as a voice or text call. The consent may be limited in authorizing communications within indicated restrictions or limitations. For example, consent may be granted for making voice calls within certain time windows, days of the week, or for certain purposes. The consent may also be limited as to whether certain equipment, such as an autodialer, can be used.

Consent Indication—information related to consent conveyed in the consent indicator data element.

Consent Indicator Data Element—a data element stored in memory used by a computer based processing system to store an indication of consent. This may also store related restrictions associated with the consent. The consent indication data element may be part of, or separate from, a call record.

Consent Status Information—information related to the status of consent, such as that indicated by a consent indicator data element. The consent status information may be indicated by a computer-based processing system to a user by a graphical user interface graphically depicting an icon or text.

Contact Center—a commercial enterprise focused on handling communications. These may be of various channel types (voice, chat, fax, text, etc.). Further, the communications may be inbound or outbound, or a combination of both, with respect to the contact center. A contact center may be physically located in a building, or may be virtual, wherein the agents handling the communication may be distributed.

Manage-Consent Icon—an icon used on a graphical user interface comprising identifying a function related to managing consent information.

Manage Data—related to reviewing, setting, or resetting data, such as data conveyed by a consent indicator data element.

Revocation of Consent—withdrawing previously granted consent. The revocation of consent may be limited to certain types of communications or may be limited with respect to other previously granted restrictions.

Workstation Computer—a computer specially adapted via hardware and/or software for use by an agent for handling communications and performing related functions in a contact center.

Exemplary Contact Center Architecture

FIG. 1 shows one embodiment of a contact center architecture 100 illustrating the various technologies disclosed herein. The contact center architecture 100 shown in FIG. 1 may process various channels of communication such as voice calls, facsimiles, emails, text messages, video calls, Web chats, etc. that can be inbound-only, outbound-only, or a combination of both (sometimes referred to as a "blended" contact center). In particular instances, the contact center may be referred to as a call center, even though it may process more than just voice calls. However, for purposes of this disclosure, the term "contact center" is used throughout, although it is understood that the two are synonymous.

The contact center may handle communications originating from a remote party or initiated to a remote party. Thus, the term "party," without any further qualification, refers to an individual associated with a communication processed by the contact center, where the communication is either received from, or placed to, the party. Although the agent is also a party associated with the communication, to avoid confusion, the term "party" only refers to the person that the agent is communicating with.

Depending on the embodiment, communications may originate to, or be received from, parties using a variety of different devices. For instance, a party may receive or place a voice call using a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

In addition, a party may receive or place a communication using a device such as a desktop or laptop computer 110a, a smart phone 110c, mobile phone, tablet, or other mobile device. Depending on the device, these communications may be placed or received via an Internet provider 135a, 135b and/or wirelessly via a mobile service provider ("MSP") 112. For instance, communications may be routed to the PSTN 115 using an integrated services digital network ("ISDN") interface 116b or other type of interface that is well known to those skilled in the art. While in other instances, the MSP 112 may route communications as packetized data to/from an Internet provider 135b using Internet-based protocols. For convenience, unless indicated otherwise, the term "trunk" refers to any type of facility 116c, 116d, or 116e providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 131 for initiating and/or receiving communications based on the channel of communication. For instance, in various embodiments, communications such as inbound calls and/or inbound SMS text messages are received from parties by a contact device 131. In one embodiment, the contact device may be an automatic call distributor ("ACD") or other form of specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 165, 168 to an available agent. Depending on the embodiment, the facilities 165, 168 may be any suitable technology for conveying the call and/or message, including but not limited to a local area network ("LAN") 170, wide area network ("WAN"), ISDN, and/or conventional TDM circuits. The exact details typically depend in part on the technology used. For example, in one embodiment, first facilities 165 may be analog or proprietary voice communication technology whereas second facilities 168 may be SIP oriented. As may be appreciated, there are various technologies and configurations that are possible. In addition, the facilities 165, 168 may be the same or different from the facilities used to transport the call and/or message to the ACD.

Depending on the embodiment, the contact device may place a call and/or text message in a queue if there is no suitable agent available. Further, the contact device may route a call to an interactive voice response system ("IVR") 130 to play voice prompts and/or may route a text message to an interactive text response system ("ITR") 140 to send message prompts. Depending on the embodiment, these prompts may solicit information from the party and the IVR 130 and/or ITR 140 may collect and analyze responses from the party in the form of dual-tone multiple frequency ("DMTF") tones, speech, and/or text. In addition, the IVR 130 and/or ITR 140 may be used to further identify the purpose of the call or text message, such as, for example, prompting the party to provide consent or revocation information or otherwise obtain information used to service the call or text message. Further, in particular embodiments, the IVR 130 and/or ITR 140 may interact with other components, such as a data store 175, to retrieve or provide information for processing the call or text message.

Continuing on, in various embodiments, communications such as outbound calls and/or outbound SMS text messages may be sent using another contact device 131 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. The contact device may be a predictive dialer, which is a type of dialer that may originate calls to multiple telephone numbers simultaneously with the expectation that agents will be available to handle one or more of the calls that are answered and/or text messages that are responded to. In various embodiments, the predictive dialer makes use of one or more algorithms to determine how and when to dial/text numbers so as to minimize the likelihood of a party being placed in a queue while maintaining target agent utilization.

Once a call is answered or is responded to by a party, the dialer may connect the call to an available agent using one or more facilities 165, 168. Other types of dialing methods may be used such as preview dialing in which information about an account is displayed to an agent to review prior to the dialer originating a call or text message to the account. In this way, when the party answers the call or responds to the text message, the agent can interact with the party in an effective way. The dialer may also originate a call and connect the call to the IVR 130 or direct the text message to the ITR 140 for processing upon the party answering the call or responding to the text message. Further, in particular embodiments, the dialer may be configured so that it attempts to establish communication with parties using a calling/texting list of telephone numbers that is stored in a data store 175.

Depending on the embodiment, other contact devices may be used for originating and/or receiving other channels of communication such as Web chats, emails, SMS text messages, etc. For example, the contact center may make use of a web server to host Web pages and interact with parties via Web chats. In addition, the contact center may make use of an email server 150 to receive and send emails from parties. While in other embodiments, the contact center may convey and/or receive SMS text messages to/from a gateway 155 instead of an ACD or dialer, which then conveys the messages to the Internet 135b and on to a mobile service provider 112. In these particular embodiments, such a gateway may provide a way for the contact center to send and/or receive SMS text messages that are not in a native SMS protocol and can be accepted or conveyed by the mobile service provider 112.

Again, information associated with these other channels of communication may be stored in the data store 175. In addition, like calls, a transfer-like operation may be used in various embodiments to connect a communication that has been answered and/or received with an available agent, or if an agent is not available, a queuing operation may be used to place the communication in a queue until an agent is available.

Accordingly, in various embodiments, the contact center may make use of an email system 150 to receive, process, and store various email and/or chat messages. These emails messages may be from parties seeking to grant, revoke, or otherwise modify their consent information related to receiving future communications from the contact center. In some embodiments, this server may also process SMS or text messages, while in other embodiments, a separate SMS server e.g., 155 may be used, or the functionality may be integrated in the call handling contact device 131.

An agent at the contact center typically uses a computing device 160a-160c, such as a personal computer, and a voice device 161a-161c to handle communications. The combination of computing device 160a-160c and voice device 161a-161c may be referred to as a "workstation." However, in particular embodiments, the computing device 160a-160c may also handle voice (e.g., VoIP) or voice capabilities may not be needed so that reference to an agent's "workstation" may only refer to a computing device 160a-160c without the use of a separate voice device 161a-161c.

Agents typically log onto their workstations prior to handling communications and this allows the contact center, specifically the contact device 131, to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 131) may queue the communication for the next available suitable agent.

Depending on the embodiment, interaction between a contact device 131, as well as other components within the contact center architecture 100, and agent's workstation may involve using a local area network ("LAN") 170. In addition, in particular embodiments, an agent may interact with components that provide information to the agent's workstation. For example, when a communication is directed to an agent, information about the party on the communication may be presented to the agent's computer device 160a-160b over the LAN 170 using facility 168.

Finally, another component that is employed in the contact center architecture 100 shown in FIG. 1 is a miscellaneous server 155 that may be used to handle other forms of communication. In one embodiment, this may be a voice messaging system to allow voice messages to be retrieved and played. It may further perform a speech-to-text transcription of the voice message. In other embodiments, it may receive, store, and manage images of letters, which have been scanned. This may be used to allow other forms of communication to be managed by an agent. For example, consent may be received from a party via a letter, which is then scanned and stored in the server 155. Or, a voice mail message may be stored where the party indicates revocation of their consent. Finally, the miscellaneous server could also be a fax server. This would allow a party to communicate their consent or revocation of consent via a fax.

In each of these embodiments, information regarding the consent or revocation could be presented to the agent on their computer, which invokes a function to manage consent for that person. Thus, a person could indicate their consent related information by text, email, fax, voice message, or postal letter, with the resulting information displayed to the agent, who is then able to manage the information for that account. This architecture anticipates that a party may opt to use a different channel to indicate, or revoke their consent, to receive voice calls or other forms of communication. In various embodiments, the various servers, e.g., email server 150, ITR 140, IVR 130 and miscellaneous server may be integrated or otherwise implemented in various combinations. In the disclosure herein, the management of consent is largely illustrated with the party interacting with the agent on a voice call for purposes of managing their consent. However, one skilled in the art can readily envision how other channels and mechanisms could be used. For example, a voice messaging system allows the party to leave a message, which is then reviewed by the agent, which merely time-shifts the interaction between the agent and the party.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Service Overview

Agents in a contact center are frequently expected to confirm, reconfirm, or modify consent information related to whether the remote party can be reached at a particular telephone number. The consent may be in regard to authorization to call the party or it may be in regard to using certain equipment (frequently called an autodialer) to call that party at a specific number. Or, it may be that the authorization allows a pre-recorded message to be played to the party.

The agent may confirm this consent with the party in various scenarios, including for both incoming and outgoing calls (relative to the contact center of the agent). For example, a customer may call into a customer service contact center inquiring about a resolution of a problem related to a product recently purchased. The agent may have to obtain the customer's contact information and report back later as to the resolution. This may necessitate getting not only the telephone number where the party can be contacted, but getting their express consent that the agent can call back the individual. In some cases, the callback may be the type of call that requires obtaining express consent from the remote party. For example, some regulations, such as the Telephone Consumer Protection Act ("TCPA"), restricts certain types of calls made to a wireless number. In another example, a customer may wish to be notified when their automobile has been repaired and available to use. The customer may consent to receiving a computer dialed call that plays a pre-corded message at their work, home, and cell number. This ensures the party is informed in the timeliest manner.

The agent may obtain or already have on file a plurality of telephone numbers where the party can be reached. In some embodiments, the party indicates a plurality of telephone numbers where they can be reached, so that in case one number goes unanswered, another number may be attempted. This may be the case even if the party has voice mail service associated with each number. Thus, the party may provide the agent with a home number, cell phone number, work number, alternate home number, etc. The party may even provide instructions as to when and under what circumstances each number should be used.

During a call, the agent may be required to confirm or reconfirm the party's consent that a number can be dialed via an autodialer or some other automated means. In other embodiments, the agent may simply confirm whether the individual can be contacted at all, regardless of what type of equipment is used. In other embodiments, the agent may confirm that the number is still associated with the called party (this may involve confirming the name of the intended party answering the phone). Thus, the scope of consent can cover any such application. It is further possible that different forms of consent may be defined for different purposes.

Frequently, information about alternative phone numbers has been previously collected by another agent in a prior call or interaction with the enterprise. Consequently, when a call is placed to the party, the present agent may not readily realize that there are other telephone numbers at which the party may be reached or other channels that may be available to reach the party. While the call handling system may store and retain this information, it may not necessarily present all of this information to the agent each time a call is placed to the party. Presenting all of this information on every call can be annoying to the agent, and interfere with other information that the agent is required to use or convey to the remote party. In other embodiments, information about alternative numbers/channel may be presented to the agent during a call, but without the corresponding confirmation/authorization information.

Thus, the situation is that the agent may be required to know all of these alternative telephone numbers when the agent is seeking to reconfirm consent, but at the same time, presenting all of this information to the agent for each call can be annoying, time consuming, or interfere with the agent's job. Further, existing mechanisms for allowing the agent to confirm or reconfirm that the party has provided consent to be called at each number can be tedious and time consuming.

One approach to addressing this issue is to selectively provide the agent with the additional telephone contact information, along with consent related information and controls to modify the consent related information. This allows the agent to update consent status information for one number or a series of numbers, without unduly distracting from the agent's task at hand.

This consent-related information should be made available to an agent when needed regardless of whether the call was an incoming call from the remote party or an outgoing call to the party. In some embodiments, the agent may need access to this information even when not on a current call with the party. For example, an agent may be processing consent-related information on one channel where the consent is related to another channel type. Specifically, the agent may be reviewing, e.g., a scanned image of a letter or the text of an email from a party requesting their consent information to be updated as it pertains to e.g., making a voice call to a particular telephone number. In this embodiment, the agent may invoke the manage consent function even though they are not on a call with the party. However, for purposes of simplicity, the concepts are illustrated herein when the agent is on a call speaking to the person.

The consent information management tools should be provided when the agent needs to review consent-related information, which can be accomplished by providing the agent with a "consent" related icon on their computer screen. When the agent selects the "consent" icon from their agent toolbar, additional consent-related information and controls for managing consent is then presented to the agent. The additional information comprises information about other potential contact numbers that can be used to reach the agent and each number's corresponding consent status. Further, information may also be shown indicating whether the consent status applies for a voice call, text call, or both. Control information may allow the agent to alter the consent status for one or more numbers. The changes may be done individually or on a group of numbers.

In addition to managing consent, the agent may also manage other aspects related to consent. For example, an individual may inform the agent that consent is limited to certain time windows or days of the week for a certain number. The agent can also indicate appropriate time windows for each number, and potentially specify this for each method (i.e., channel) of communication (e.g., voice call or text call).

Process Flow

A high level process flow of the concepts are now addressed. The operation of various embodiments illustrating application of the concepts is reflected in the process flows of FIGS. 2-4. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

In various embodiments, the processes may be associated with a consent management module, which is part of the contact device or call handler. In other embodiments, it may be in a separate server or integrated with one of the other components shown in FIG. 1. Those skilled in the art will recognize that this functionality may be integrated or performed in one or more components in the contact center.

Figure 2:
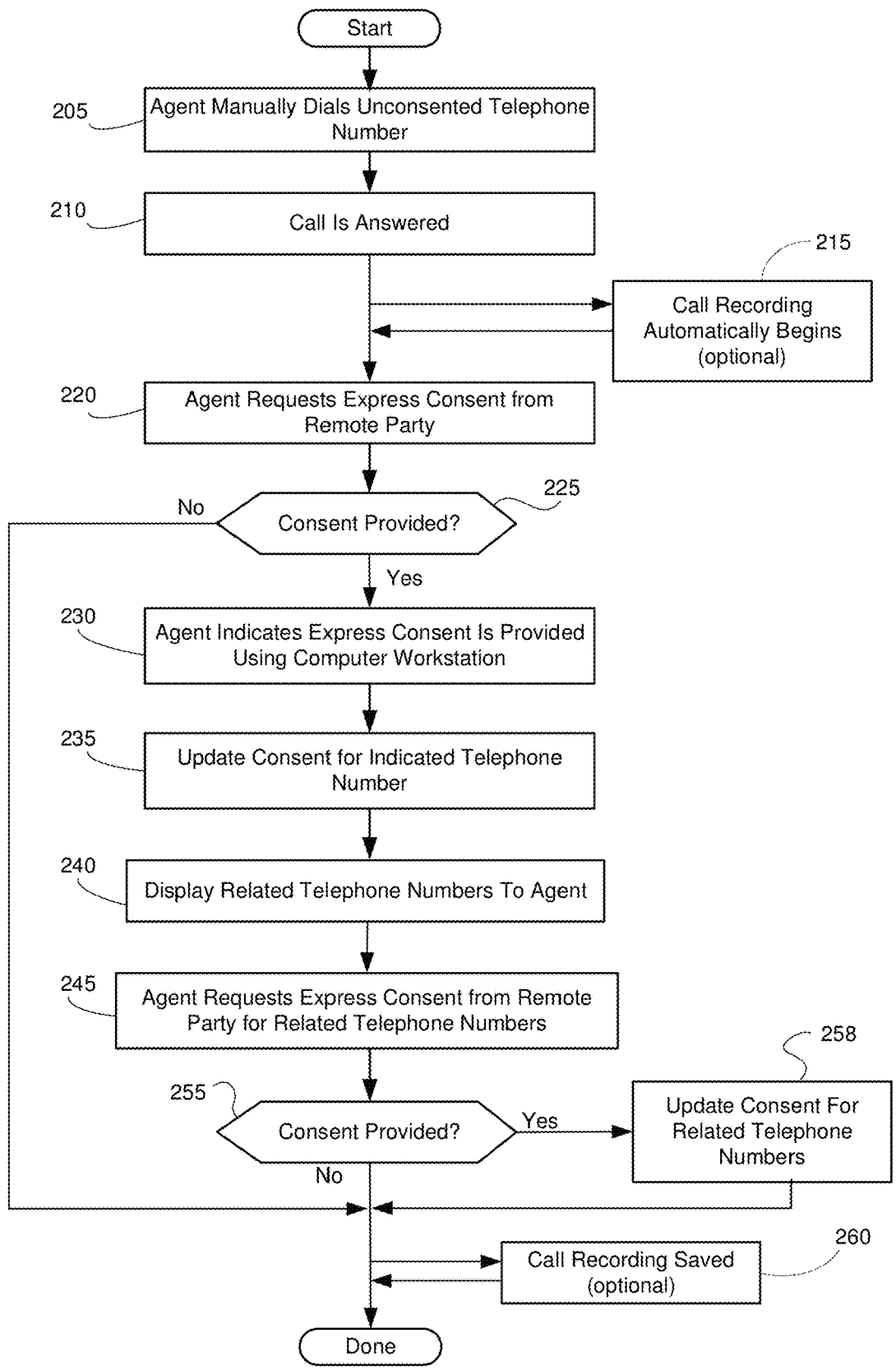
FIG. 2 illustrates one embodiment of a process flow of an agent updating consent indicators for one or more telephone numbers associated with a remote party.

Turning to FIG. 2, a high level process flow is shown of one embodiment where an agent obtains consent from a remote party. In this embodiment, the consent pertains to authorization to place a future call to the party's wireless number using an autodialer. In other embodiments, the consent may be for receiving a recorded message to the caller at a wireless or wireline number. In other embodiments, the consent may be for generally receiving any type of call or notification at all.

This example is based on the agent speaking with the party directly. Further, this example is based on the call being originated by the contact center, as opposed to the party calling into the contact center. The process begins in FIG. 2 with the agent manually dialing an "unconsented" telephone number in operation 205. It is possible that no consent exists to use an autodialer to reach the party, and so the call is manually dialed. The infrastructure that may be used is disclosed in the aforementioned patent applications, the contents of which are incorporated by reference. Thus, the number may be considered as an "unconsented" telephone number. An "unconsented" telephone number does not necessarily mean that the party has refused permission to be called, but merely that consent to be called using an autodialer has not been provided. In such cases, it may default to being treated as if there was no consent, or as if consent were revoked, with respect to using an autodialer of some sort. Thus, it may be appropriate to call the person using a manual dialer. The agent may dial the number using infrastructure which does not qualify as an autodialer under various judicial interpretations of the Telephone Consumer Protection Act ("TCPA").

The call is then answered in operation 210. At this point, an optional call recording process may commence in operation 215. Initiating and maintaining a call recording can serve as evidence to confirm that the remote party did provide consent (or as will be seen, has revoked consent). Thus, in cases where an agent may misinterpret or miscode the party's request and a dispute later arises, the call recordings can serve to determine whether a mistake was made, and clarify any confusion. This is not required in all embodiments.

At some point during the call, the agent may request express consent from the remote party with respect to the currently dialed number in operation 220. The scope of requesting such consent in this operation may encompass solicitation of more than just a "yes" or "no" answer from the remote party. The request for consent may encompass confirming the number dialed by the agent, the type of number (e.g., wireless or wireline, and/or home number, work number, etc.), channel related information (text or voice) and any additional limitations or restrictions associated with receiving consent. Thus, a number of questions and interactions may be involved between the agent and called party.

For example, the party may give consent to receive voice calls, but not text calls, to their cellular smart phone, provided such voice calls are made between 1:30 p.m. and 8:30 p.m. during the weekdays. Thus, a party may indicate time-of-day and/or day-of-week restrictions on receiving certain type of calls to a specific number. However, the first question in regard to obtaining consent usually begins with the agent asking an initial broad question, and these additional details are usually dependent on what answer the party provides.

Thus, if consent is not provided at a high level in operation 225, the process continues to the optional operation of saving the recorded call in operation 260. This allows a recording to be saved of the agent requesting, and the party denying, consent to be called. The saving of the call recording is not required, and if not exercised, the process flow is completed. Although not shown in this process flow, an optional step may record information that consent was asked and when this occurred, even though no change to the consent status information itself has occurred. Recall that the call was manually dialed, based on the absence of consent, and if the party does not provide consent, the information may be unchanged—e.g., consent does not exist.

If, however, at operation 225 the party does provide consent to be called, then the agent will indicate that consent has been provided by the part in operation 230. This action is performed by the agent interacting with their computer, which interacts with a consent management module, which may be executing in the contact device or other component in the contact center. Indicating consent has been received may involve the agent invoking a specific function key, which signals that consent has been provided with respect to the dialed number for the current call and results in updating information associated with that number in operation 235.

At this point, the system may then inform the agent of other telephone numbers associated with the party or the party's account. These related telephone numbers and their status information is then provided to the agent in operation 240. This is usually displayed on the agent's computer. It is timely and appropriate for the agent at this time to inquire to the party as to whether the consent granted extends to other telephone numbers associated with the party. The party may have incentive to provide other numbers, to increase the likelihood that they will receive timely notification of the information. If the party is granting consent to be called on the present number, they may be inclined to provide consent for other numbers as well. Or, the party may instead prefer to be contacted at a different number, or indicate a relative priority for various numbers.

When the call was originally made, the agent may not necessarily know that there are other telephone numbers associated with the called party. Or, if the agent is aware that there are other numbers, the agent may not be aware of the consent related information associated with those other numbers. In one embodiment of the present invention, the indication by the agent that consent is provided in operation 230 for the number used in the current call triggers the display of the consent status information associated with other telephone numbers for that party.

Thus, the agent can inquire to the party as to whether consent also extends to other contact numbers in operation 245. This consent can also mirror the consent provided for the current phone number, or may be a variation of the consent provided. If consent is not provided in operation 250, then the process is completed. The optional operation of saving the call recording may occur in operation 260.

If consent is provided, then the agent can update the information in operation 258. The updating of information in operation 258 may encompass providing a variety of information, and it is illustrated as a single operation for simplicity. In practice, there may be a variety of questions, responses, and details associated with obtaining and updating the consent in operation 255 and 258.

The call flow shown in FIG. 2 is based on a call originating from the contact center to the party. If consent does not exist, the call may be a manually dialed call by the agent. If consent already exists, the call may be a predictively dialed call. In this latter case, the agent may be reconfirming consent, whereas in the former case, the agent may be seeking consent. Further, the call flow in FIG. 2 could be adapted for inbound calls, e.g., where a caller calls into the contact center and during the process, is asked by the agent to provide consent or reconfirm consent. Or, the process flow could be adapted to a party that calls in to provide consent, without being first asked.

Figure 3:
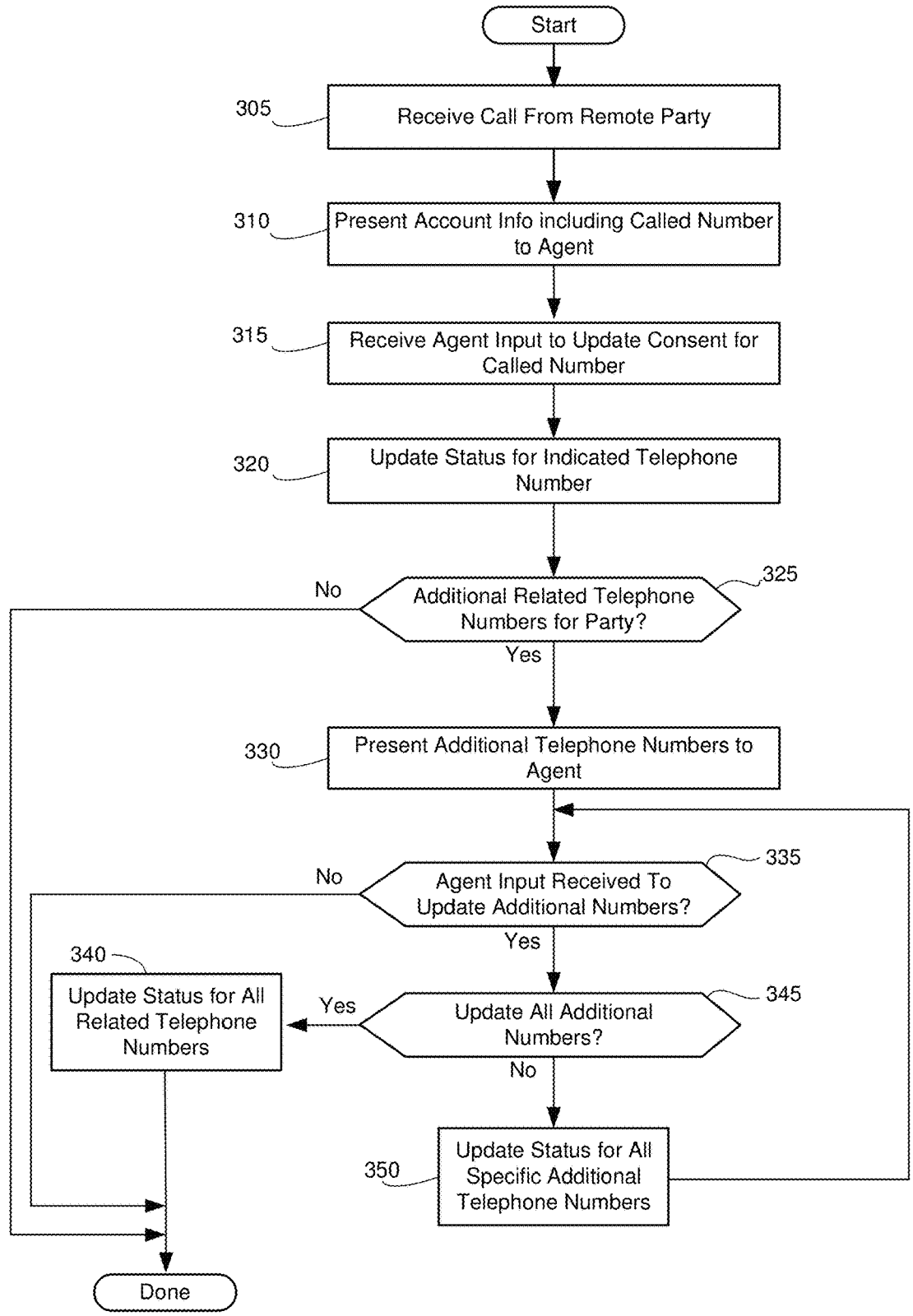
FIG. 3 illustrate one embodiment of a process flow of a consent management module interacting with an agent for one or more telephone numbers associated with a remote party.

A process flow in FIG. 3 shows another embodiment, which is based on the consent management module processing an inbound call from the party. In this case, the party is calling to revoke consent. The process begins with a call being received at the contact center from the remote party in operation 305. The call is answered, and an agent is connected to the call. Information is presented on the computer display of the answering agent in operation 310 pertaining to the originating number and related account information. This may or may not include information of other telephone numbers that are associated with the party. Since the caller is revoking consent, it is assumed that there is an account with information associated with the calling party maintained by the contact center.

At some point during the call, the party informs the agent of their desire to revoke consent. In response, the agent may invoke a function for updating consent using their computer workstation in operation 315. Invocation of this function may update the status for that number as appropriate in operation 320. This may involve revoking, or otherwise altering any restrictions of consent for the number associated with the call.

The function may further determine whether there are any related telephone numbers associated with the party's account that should be considered as well in operation 325. It is possible that if the party is requesting to alter the consent status for one number, that they may also desire to alter the consent status for other numbers. This may depend on the facts of the call. For example, the caller may be calling to indicate that their home phone number is being disconnected and that a cell phone should be used instead. Or, the caller may be informing that calls to the cell phone should not be made, but instead to another cell phone number. Or, the caller may be informing the agent that they are closing their account and no further calls to any number should be made.

If there are no additional numbers associated with the party to be updated in operation 325, then the process is complete (the optional recording of the call is not shown in this process flow). If there are additional telephone numbers associated with the party, then these are presented to the agent in operation 330. If there are additional numbers, the agent may inquire at this point whether the party would like to alter or revoke consent with respect to these other numbers. In some embodiments, the agent may not inquire, since the original request from the party may be unambiguous. For example, if the party requests to revoke all forms of consent for all numbers associated with them, the agent may not necessarily inquire as to whether this is desired for each number. This may be the case for example, when a party closes an account.

If there are no further changes indicated by the party, then there will be no further agent input in operation 335 to update other related telephone numbers. The process is completed. If, however, there is input from the agent received in operation 335, the next test is to determine whether this is a global update to all numbers associated with the party in operation 345. For example, if the party revokes all consent for all numbers, then the agent may desire to globally update information for all numbers. This can be done in operation 340. In some embodiments, a single function can perform this action. At this point, the process is completed.

If the update in operation 345 is not a global update, then the update may be for specific numbers or specific aspects of certain numbers. For example, the party may desire to alter the allowable day-of-week or time-of-day parameters for when they receive calls at a specific number. Thus, in this case the process proceeds to update the status of a particular number in operation 350. The process then loops back to operation 335 to determine if there are any further updates to make with respect to the consent.

The test defined in operation 345 allows a global update to easily occur, since a party may grant or revoke consent for various numbers on a global basis. For example, a party may have four or five contact numbers, but if the account is being closed, it would be easier if the agent could perform a global update for all number. Or, the party may state, e.g., it is never acceptable to receive any calls during a weekend for any telephone number. Or, that calls should never occur earlier than 11:00 a.m. (because the individual may be working night shifts). A function for globally applying an update of various consent related information for a variety of numbers and/or channels will save the agent time and minimize errors.

Graphical User Interface—FIGS. 4A, 4B, 4C, 5 and 6

Figure 4A:
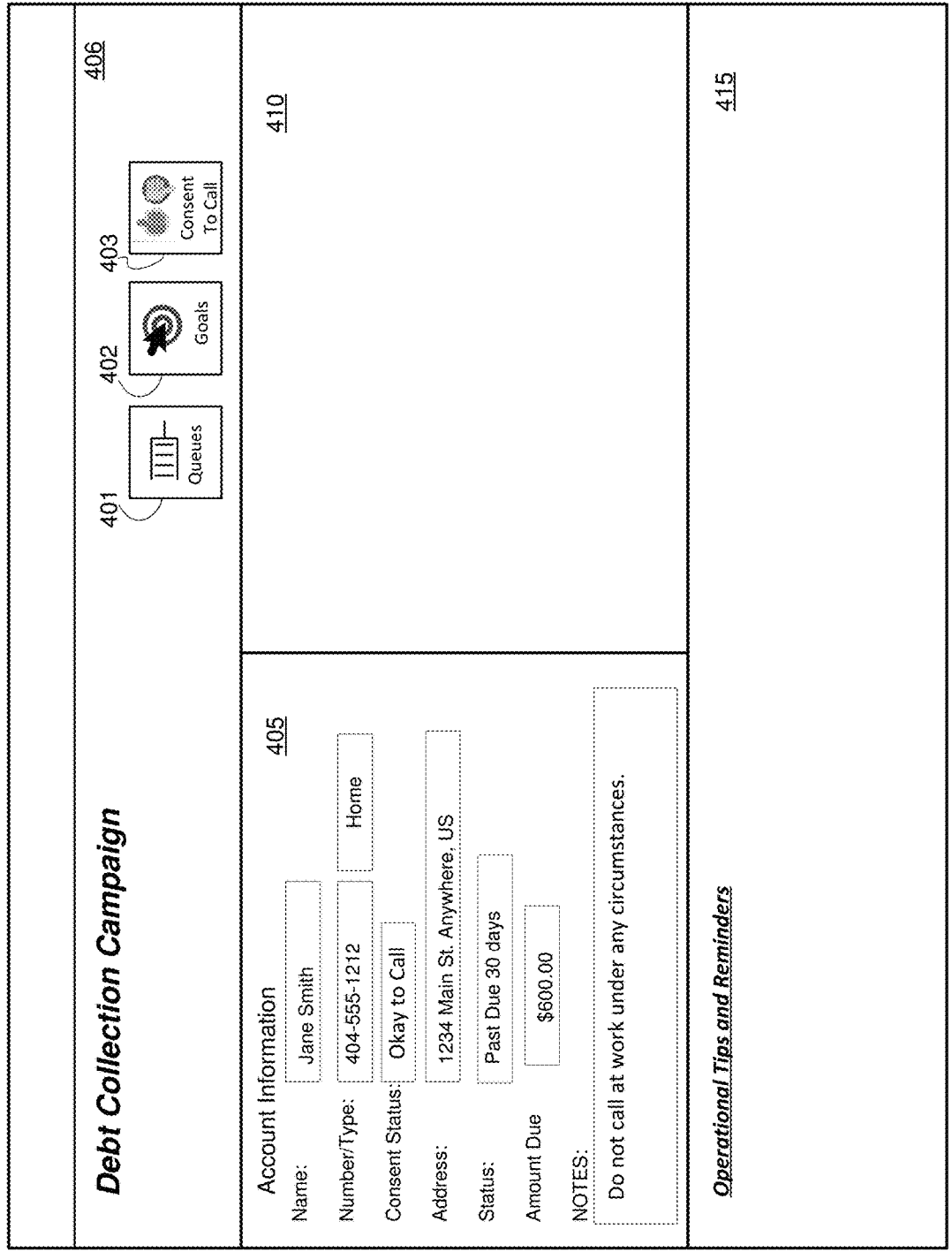

Illustrating how the call handler system can facilitate the agent managing consent can be accomplished using one embodiment of a graphical user interface that may be presented to the agent. Turning to FIG. 4A, one embodiment of a screen image is presented that an agent would see on their computer after a call is initiated to a party. In this embodiment, the screen image 400 is divided into several window sections or portions. The first section 406 is the agent widget bar, which displays various agent widgets. These are icons for functions which the agent may invoke. These may be invoked in relation to a present call, or may be invoked between calls. In this example, there are three such agent widgets 401, 402, and 403. Typically, there are a number of widgets that the agent can access, and only three are shown. The "queues" widget 401 may be related to pending non-voice call requests to alter consent. For example, there may be a queue of emails, SMS texts, or scans of letters which represent requested changes from individuals to alter their consent status information. Selecting this widget would present the agent with a list of each such request. The agent could select one to retrieve the information in the corresponding format, and then proceed from that point.

The widget relative to the consent management function is the "consent-to-call" widget 403. It further includes, for purposes of illustration and not limitation, a "thumbs up" and a "thumbs down" symbol to represent that consent can be granted or revoked. This consent-to-call widget can be invoked by the agent during the call, by selecting the icon with a cursor and clicking on it, although other well-known methods and techniques can be used. However, at this point, the screen image is based on the agent not having selected that widget 403 at this point in time.

The next window section 405 displays account information associated with the current call. When a call is placed by the dialer (or received by a call handler) and the call is answered, the account information may be displayed to the agent. This example is based on a debt collection campaign, but other applications could be used to illustrate the concepts. The account information comprises various information such as the name of the account, the telephone number and type of the account, the address of the account, the corresponding payment status, and amount due. A "notes" field is also shown where the agent may insert various instructions or comments. Consent status information may or may not be displayed for the number used on the present call.

There are two other portions shown, which include a supplementary information section 410 and an operational tips and reminders section 415. These sections are blank at this point during the call. In other embodiments, the agent may be presented with some supplementary information in the supplementary information section 410 or tips/reminders in section 415. Further information of what may be presented to the agent is shown in FIG. 4B.

In other embodiments, when a call is made, the agent may be presented with further information. Turning to FIG. 4B, the agent is presented with related contact information for the party. This includes different telephone numbers at which the person can be reached and their type. This allows the agent to select these numbers to dial if the number dialed is not answered. Whether the agent views information shown in FIG. 4A or the related contact information shown in 4B when the call is initiated may be configurable based on the contact center or campaign parameters.

In either embodiment, it may be assumed at this stage that the call has been answered and the agent is conversing with the remote party. The agent may at some time during the call ask for consent, or reconfirm that consent exists to call the party on the number that was dialed. The agent may then select the consent-to-call widget 403 using their cursor on the computer.

Figure 4C:
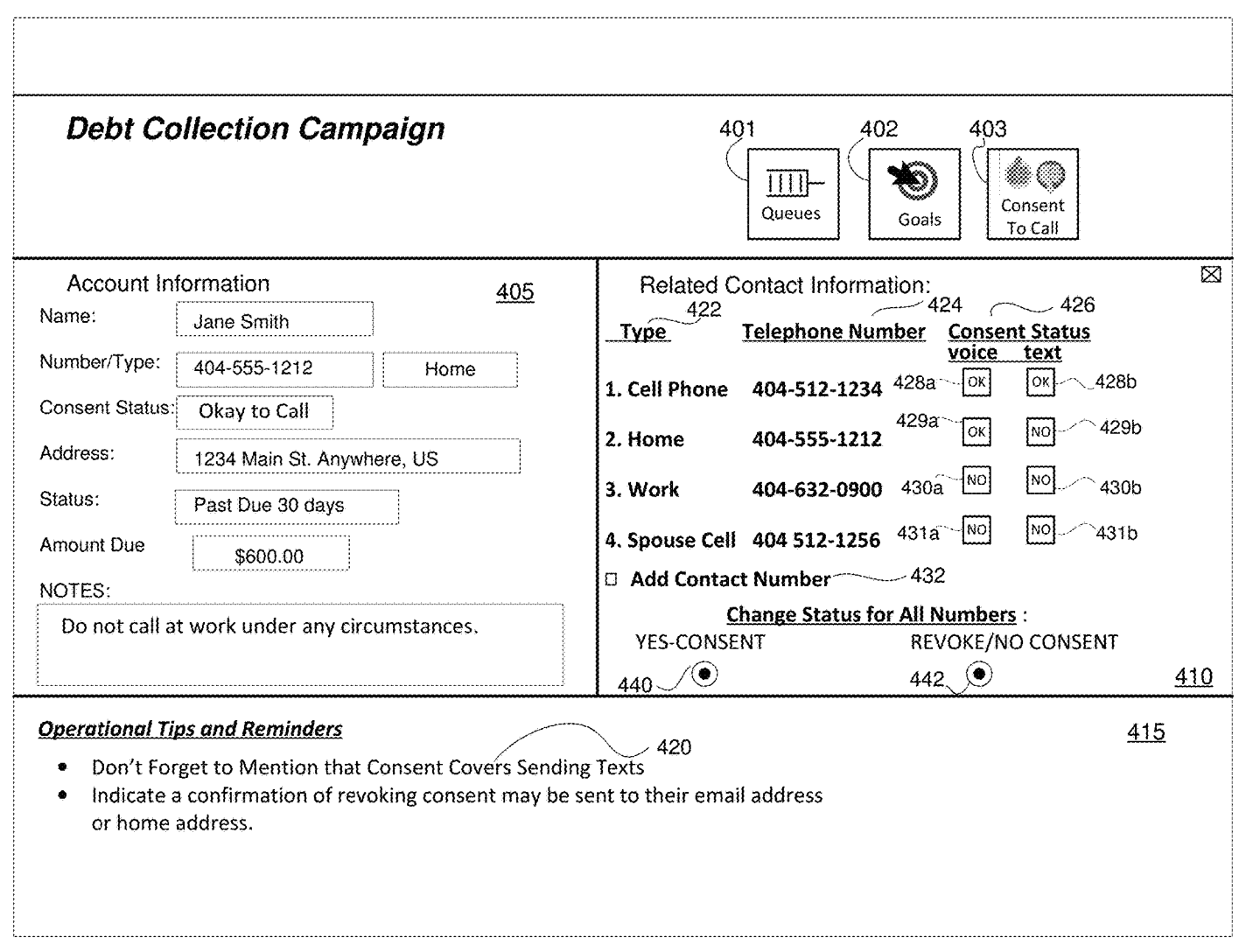

Upon selecting the consent-to-call widget 403, the agent may be presented with additional consent-oriented information and controls as shown in FIG. 4C. Turning to FIG. 4C, the agent now sees information pertaining to related telephone numbers which can be used to reach the party. This includes a listing of numbers that comprise an indication of the type of number 422, the telephone number itself 424, and the corresponding consent status 426 for two different channel types. In this example, the first number is a cell phone with a status of "okay" 428*a* with respect to voice calls, which signifies the person has provided consent to be contacted via a voice call to their wireless number using an autodialer. Similarly, the consent also applies to receiving text calls on their cell phone number as indicated by icon 428*b*. With respect to the home telephone number, which may be a wireline number, there is consent to place a voice call to that number as shown by icon 429*a*. However, because it is a wireline number, the text status indicator is set to "no" 429b. Further, in this embodiment, no consent is granted to call the person at their work number or at their spouse's cell phone number, as evidenced by the "no" icons 430a, 430b, 431a, and 431b that are associated with those numbers. In some embodiments, the user may be able to alter the consent authorization status by selecting the appropriate icon with a particular number to alter the indication. In other embodiments, the user may use another screen to do so.

In addition, controls 440, 442 are provided which allow the agent to apply a global setting of consent provided or consent revoked for all numbers. Selection of these radio buttons sets the consent status to all of the numbers for the party to "yes" or "no" respectively. This facilitates the agent to quickly manage the consent status for all associated numbers. Various default configuration settings may apply.

In addition, the agent may be presented with information in the operational tips section 415. In this embodiment, text is provided 420 to the agent reminding them of operational aspects or reminders of best practices. For example, the agent may be reminded to confirm with the remote party that consent to reach the person via their wireless phone also covers sending texts to that number.

If during the conversation with the party, the agent is requested to alter the status of a particular consent status for a number, then the agent can place their cursor on the appropriate consent status icon and select it (e.g., double clicking or right clicking) to display various options. In this case, an additional status information box 432 may be presented to the agent, allowing the agent to select a particular combination of consent. This will cause the consent status icons 428a-431b to be modified accordingly.

If the party offers to provide another telephone number where they can be contacted, this can be done by the agent selecting the appropriate control 432. Selecting this icon may cause the agent to be presented with a pop-up window. One embodiment of such a pop-up window for adding a contact number and associated consent is shown in FIG. 5

Turning to FIG. 5, the screen image 500 comprises a number information section 505 where the agent can indicate the telephone number being added and its corresponding type. Options for the most commonly used types are indicated, and the agent can also indicate a defined value in the "other" selection type.

The next section is a number type section 510 that allows the agent to indicate what channel type is involved for the number indicated. A wireless number may be presumed to have both voice and text capabilities. If the agent does not indicate a text capability, then that number is presumed to not have a text capability, or that number may be presumed to not have any consent associated with that channel type.

The next section is a time restriction section 515 that allows the agent to indicate any time restrictions with respect to the consent indicated by the party. In this example, the agent can select which days are to be avoided or used. If neither box is selected, it means that there are no restrictions with respect to that day and thus that day can be used. If one or more "only" boxes are checked, then no communication can occur except on the indicated day(s).

The next section 520 allows the agent to indicate any specific time restrictions with respect to a particular number. In this embodiment, the agent may select on the clock face icon 525 to indicate a start time/end time. Or, the agent can select a "begin" time 530 and type in the value or use controls to increase a default value. Similarly, the agent can type in or alter a default a.m./p.m. indicator 535. Corresponding indicators 540, 545 allow the agent to indicate an "end" time. These time windows can be defined for a particular day of week, which is reflected in the appropriate day of week indicator 521. Selection of this indicator may allow selection of each day of the week, as well as "everyday", "weekday" and "weekend" indicators (not shown). Selecting a "weekday" value means the same calling window is defined for each weekday. This allows the agent to set the same values for every day, every weekday, or just for the weekend.

The pop-up screen 500 for adding a number allows the agent to indicate all the limitations associated with consent for an additional number provided by the agent. This is intended to provide flexibility in allowing various schedules to be defined, and to separately accommodate both text and voice calls for wireless numbers. Other embodiments may have more or fewer types of information and/or controls on this screen 500. Other embodiments may allow the agent to specify other address information for consent (e.g., email address, fax numbers, etc.)

Returning back to FIG. 4C, the agent can also edit or modify consent data associated with an existing number. For example, in FIG. 4C, the agent has selected the consent status icon 428 for the cell phone number. The agent may also be able to select the cell phone number by double clicking on it thus causing another screen pop to appear to facilitate editing the consent data for that number. This pop-up window for editing the consent data is shown in FIG. 6.

Figure 6:
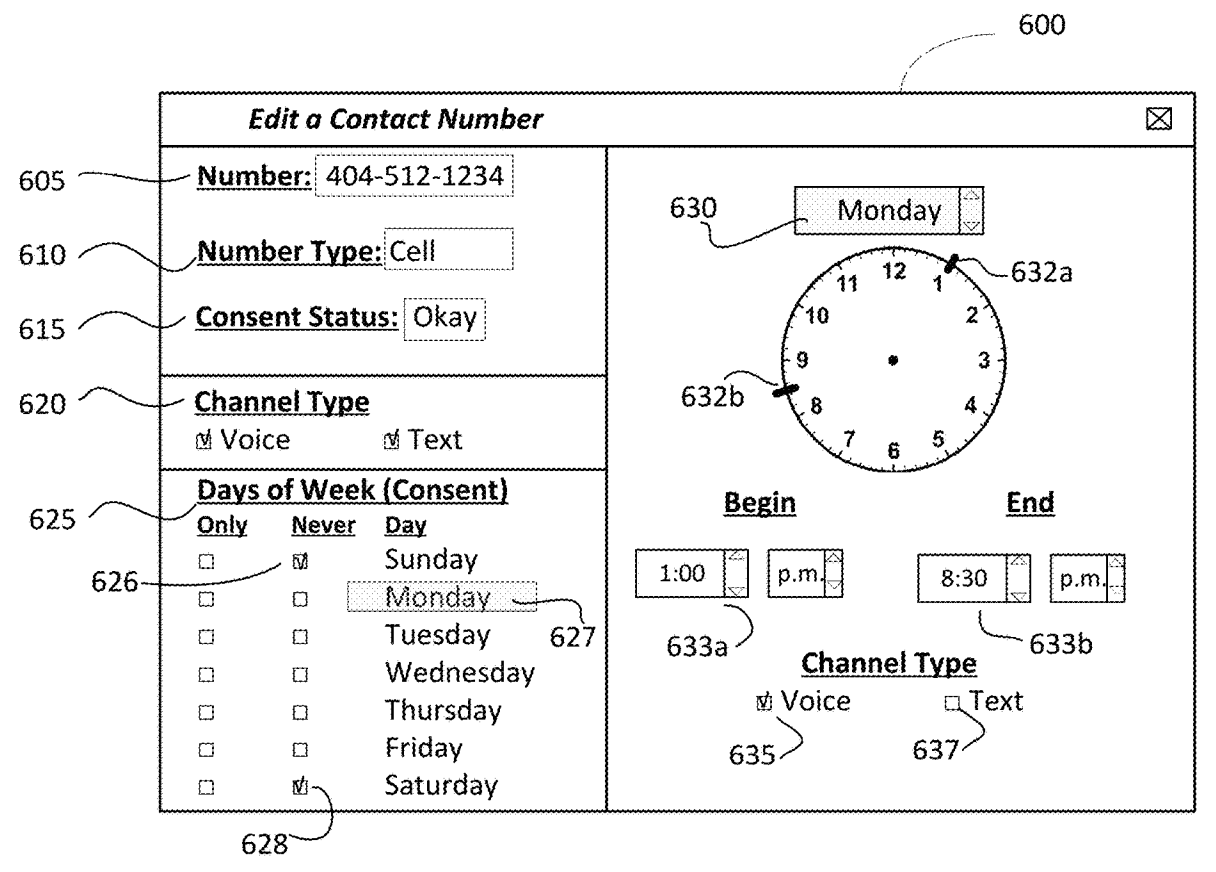

Turning to FIG. 6, one embodiment of the window for editing existing consent related information is shown. The screen 600 is similar in structure to that shown in FIG. 5. In FIG. 6, a telephone number field and value 605 is shown, along with a number type field and value 610. The currently set consent status field and value 615 is shown. These may be altered using various well known mechanisms such as pull down menus, toggle menus, etc.

In addition, a section is provided for displaying the channel type information 620. In this embodiment, the values of both voice and text are checked, which is consistent with the number being a cell phone (wireless) number 610. The next section includes time restrictions, such as the day-of-week indications 625. In this example, the values are selected so that no calls are ever sent on Sunday 626 or Saturday 628. Other days are okay. The current selected day is Monday 627, which is also reflected in the other portion of the screen 630.

The specific times for calling on Monday are shown as between 1:00 p.m. and 8:30 p.m. This is reflected by marks 632a, 632b on the clock face, and text entry boxes 633a, 633b where the values may be typed in. These values may be coordinated so that if the user changes a time for one format, the other format changes automatically in a corresponding manner. Finally, these times are selected for only the voice channel, as reflected by indicator 635. A separate time schedule for text calls may be reviewed/defined by selecting the "text" channel type indicator 637.

The agent can override or edit any of the user-selectable fields to alter the time schedule. Additional controls may be provided to facilitate the agent defining or copying information in order to create the appropriate time schedules. In the absence of defining any time windows, default values can be used. These values may coincide with other regulated calling windows, which typically are from 8:00 a.m. to 9:00 p.m., local to the called party.

Figure 7:
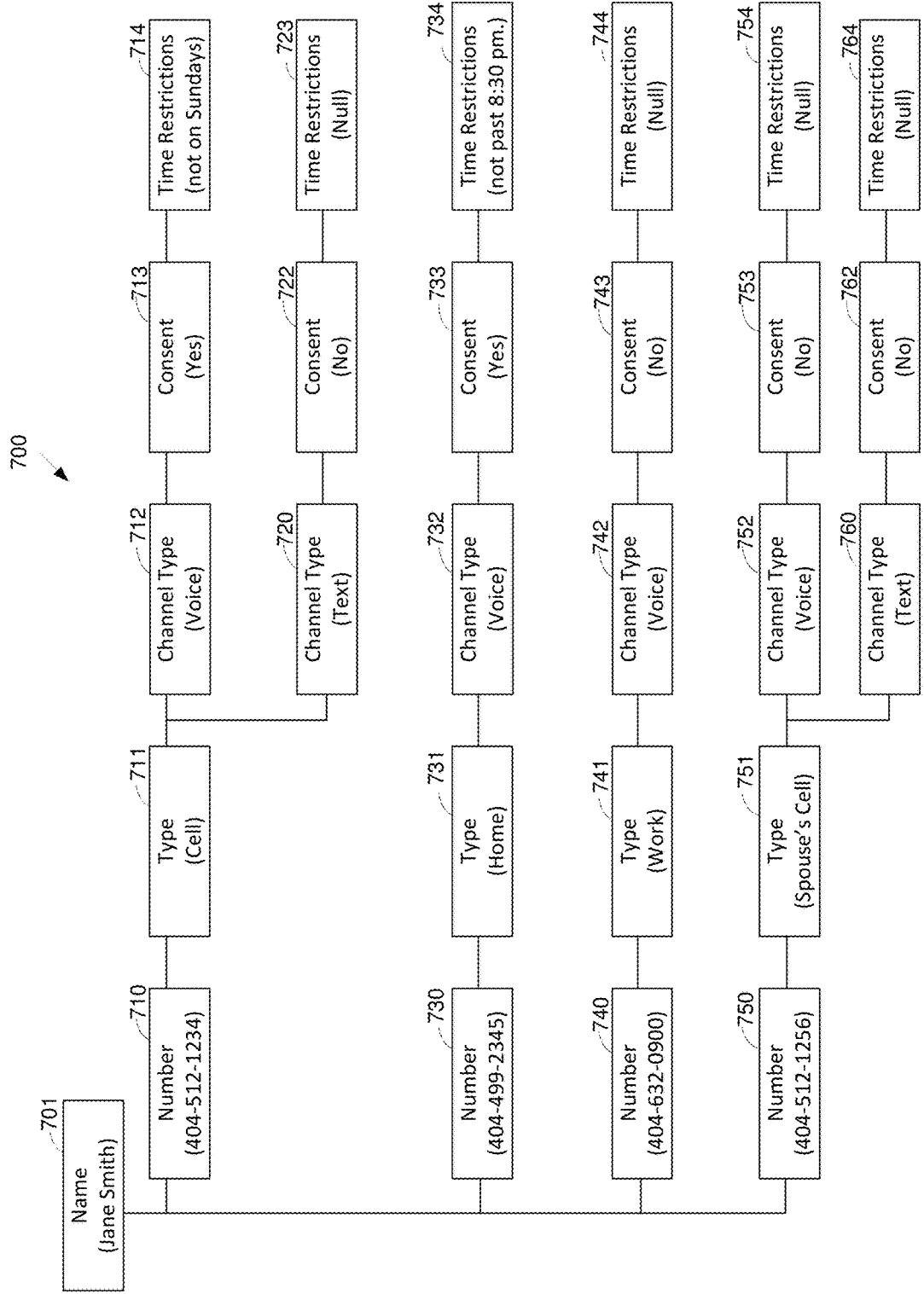
FIG. 7 illustrates one embodiment of a data schema used in a consent management module for managing consent related information for a remote party.

Data Schema—FIG. 7

In various embodiments, different consent information may be stored and managed for a party. This may be accomplished using various data storage techniques to store the information and indicate their relationship, referred to herein as a data schema. One embodiment of a data schema is shown in FIG. 7.

Turning to FIG. 7, the data schema 700 is identified at its highest level as being associated with the party's name 701. This example builds upon the previous example involving the party named "Jane Smith." In other embodiments, the name could be associated with, or subordinate to, an account identifier. The next level of information may be telephone numbers associated with the individual. In this example, there are four contact telephone numbers 710, 730, 740, and 750 associated with Jane Smith. Turning to the first contact number 710, an associated "type" indicator 711 reflects what type of number the telephone number is. As can be seen in conjunction with the other telephone numbers, embodiment of the type include cell phone number 711, home number 731, work number 741, or spouse's cell 751. Other types could be defined, including user-defined values, alternate numbers, secondary numbers, etc.

For each telephone number there is also an associated channel type indicator. With respect to the cell phone number 711, the allowable channel types include voice 712 and text 720. Similarly, the spouse' cell phone number 750 includes a voice type 752 and text type 760.

Each may have different consent related aspects associated with it. Other telephone numbers may be wireline, such as the numbers indicated as a home type 731 and work type 741. Since texting is not allowed on wireline numbers, these numbers are associated with a single channel type, voice 732 and 742. In other embodiments, each number may have a separate data indicator as to whether it is a wireline or wireless number. In this embodiment, this can be derived from the presence of a single channel type (e.g., voice only, which is a wireline number) or multiple channel types (e.g., voice and text, which reflect a wireless number).

Returning to the cell phone number with the voice channel type 712, there is a consent indicator 713 that indicates whether consent was obtained from the party. In this case, the value is set to "yes" 713, but other examples shown that are set to "no" 722, 743, 753, and 762. In other embodiments, values may be defined for "yes", "no", and "unknown." In some embodiments, a default value of "no" may be used if no consent has been obtained, whereas in other embodiments, a default value of "unknown" may be used.

The exact scope of what the consent indicator represents may vary. "Consent" may represent a general authorization from the party to be called, it may represent authorization to be called using an autodialer on a wireless number, it may be consent to be called on a specific number or any number associated with the party. In some embodiments, there may be multiple consent indicators associated with each channel type. This may allow different consent status indicators to be defined for different purposes. For example, an individual may not provide consent to receive marketing information from their credit card provider, but agrees to provide consent to receive fraud alerts concerning their credit card. Or, the individual may agree to receive marketing information on their personal cell phone, but does not agree to receive the same information on their home phone. Based on the particular embodiments, the data schema 700 shown can be appropriately modified.

Finally, another data structure reflects any time restrictions 714 (see also, 723, 734, 744, 754, and 764). These time restrictions may pertain to when the user agrees to receive information based on specified time-of-day and day-of-week restrictions. Various data formats may be used to indicate the appropriate restrictions. Some of the time restrictions are labeled as "null" 744, 754, and 764. These data elements may be present, even if information therein is not applicable. For example, if an individual has not provided consent to use that channel of a telephone number (e.g., 743, 753, and 762), then there is no corresponding time restriction. The time restrictions data element, if present, would be set to "null." Other embodiments may simply not include the data element.

The data schema 700 shows one embodiment of how various numbers and associated information can be correlated and structured to be associated with an individual. The schema shown is but one form, as different embodiments may use more or less information. Each of the various indicator discussed above may be reflected in a data element individually or combined in a data element. For example, the consent indicator may be indicated in a consent indicator data element, or in conjunction with various other indicators in a combined data element. Further, the data elements shown in FIG. 7 may be part of a call record or may be stored and considered as separate from a call record. The mapping of the data schema to protocol elements can occur in various ways, and the structure shown in FIG. 7 is but one way for accomplishing this. Finally, the information conveyed by an indicator in a data element can be encoded in the data element in various ways. Further, it is possible that an indicator may have several values that can be encoded in a data element. For example, an indication of consent can have a "no" value (indicating no consent exists), a "yes" value (indicating consent does exist), or an "unknown" value (indicating that consent has neither been given nor revoked.) In other embodiments, a default value of the indicator can be set. Thus, if a new number is added to a party's call record, a consent indication could be set to "unknown" even though other numbers associated with the party may reflect "yes" or "no."

In addition, some embodiments may incorporate a date/time stamp as to when the consent indicator was last changed. Other embodiments may retain the history of when each change was made including the last change, and by which agent. This may facilitate retrieving audio recordings, or other relevant documents, such as facsimiles, chat, or email correspondence records, as to when the change in consent status was requested, when it occurred, or determining who made the change.

The data schema 700 shows one embodiment for allowing consent to be given separately for a voice channel and a text channel of a mobile number. Other embodiments may use other techniques. It is possible that some embodiments may require the voice channel type to be equal to the text channel type, so that if consent is given (or revoked), it equally applies to both channels.

Finally, the data scheme 700 applies to managing consent for telephone numbers. It could be extended to also include managing consent for fax numbers, email addresses, and even postal addresses. Information on each address could further include other restrictions or limitations, such as limitations on the scope of communications for which consent is provided.

FIG. 7 also can be used to illustrate how defining a global process to modify consent (e.g., revoking consent for all telephone numbers) allows a process that can quickly update a plurality of indicators 713, 722, 733, 743, 753, and 762 in one action, as opposed to requiring the agent to select each number, each channel type, and then update each consent indicator in the data schema. In various embodiments, providing a capability for globally updating consent can save significant time on the agent's behalf.

Figure 8:
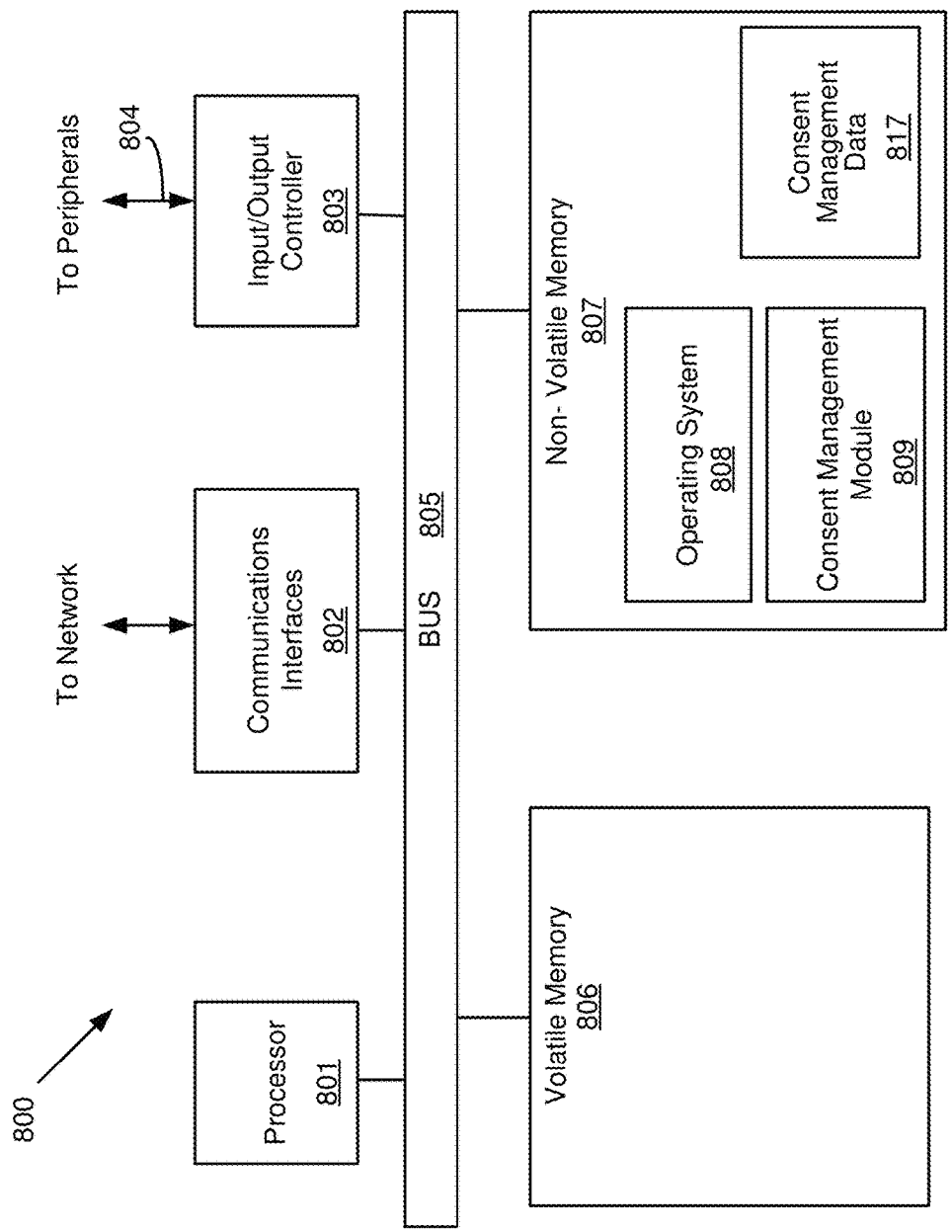
FIG. 8 illustrates one embodiment of a processing system used to implement the concepts and technologies disclosed herein.

Exemplary Component Architecture—FIG. 8

FIG. 8 is an exemplary schematic diagram of a computer processing system that may be used in an embodiment for any one of the components used in the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Specifically, the schematic diagram of FIG. 8 may represent a system executing the consent management module, the agent workstation computer, the call handler, or other component. There are various potential embodiments, and the system shown in FIG. 8 may be modified to accommodate any one of the above components. Further, in various embodiments, a common processing platform may be used to execute software for providing various functions in an integrated manner.

As shown in FIG. 8, the processing system 800 may include one or more processors 801 that may communicate with other elements within the processing system 800 via a bus 805 or some other form of communication facility. The processor 801 may be implemented as one or more complex programmable logic devices ("CPLD"), microprocessors, Von Neumann based microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. Each of these must be programmed accordingly to perform the functions disclosed herein.

In one embodiment, the processing system 800 may also include one or more communications interfaces 802 for communicating data via the local network with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 803 may also communicate with one or more input devices or peripherals using an interface 804, such as, but not limited to: a keyboard, a mouse, a touch screen/display input, microphone, pointing device, etc. The input/output controller 803 may also communicate with output devices or peripherals, such as displays, printers, speakers, headsets, banner displays, other components in the contact center, etc. These may be used, in part, to receive data, such as alert and checkpoint widget related data retrieved from an external database.

The processor 801 may be configured to execute instructions stored in volatile memory 806, non-volatile memory 807, or other forms of computer readable storage media accessible to the processor 801. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. Specifically, the non-volatile memory 807 may store code associated with a consent management module 809 that may perform the above mentioned process flows and/or operating system code 808 containing instructions for performing the process and/or functions associated with the technologies disclosed herein, including the various call handling functions. The consent management module 809 may also access the various consent management data 817 disclosed above (including which channels, time restrictions, number types, etc.) and process the related information described above. The volatile memory 806 and/or non-volatile memory 807 may be used to store other information including, but not limited to: the aforementioned data elements/schemas, applications, programs, scripts, source code, object code, byte code, compiled code, interpreted code, machine code, executable instructions, or the like. These may be executed or processed by, for example, processor 801. These may form a part of, or may interact with, the consent management module 809. In some embodiments, the consent management module 809 may be integrated or located in another component. Although the embodiments herein have described the consent management module as a single module, in other embodiments it may be multiple modules. Further, these modules do not necessarily have to execute in the same component. Similarly, the consent management data 817 may be segregated and stored as separate data files or structures on separate components.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory nor propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation, except for the terms defined in the glossary herein.

The invention claimed is:

1. A method by a call handler in a contact center to originate a call to a wireless telephone number associated with a party based upon a consent indicator data element, comprising:
   selecting by the call handler a call record comprising the wireless telephone number associated with the party;
   determining the consent indicator data element associated with the wireless telephone number reflects consent from the party to call the wireless telephone number;
   establishing the call to the wireless telephone number from the call handler based on the consent indicator data element reflecting consent from the party;
   displaying the wireless telephone number on a workstation computer used by the agent;
   connecting an agent in the contact center to the call;
   verbally receiving by the agent from the party during the call a revocation of consent to initiate future calls to the party at the wireless telephone number;
   selecting a manage-consent icon on the workstation computer used by the agent during the call to manage data stored by the consent indicator data element;
   receiving in the call handler during the call an indication of the agent selecting the manage-consent icon from the workstation computer;
   modifying the consent indicator data element by the call handler during the call in response to receiving the indication of the agent selecting the manage-consent icon to reflect the revocation of consent by the party from receiving future calls to the wireless telephone number, wherein the call handler is programmed to not originate a subsequent call to the wireless telephone number based on the consent indicator data element reflecting the revocation of consent;
   displaying a second telephone number with the wireless number on the workstation computer in response to receiving the indication of the agent selecting the manage-consent icon;
   receiving a second input at the workstation computer during the call after the second telephone number is displayed, the second input indicating the revocation of consent should be associated with the second telephone number associated with the party displayed to the agent on the workstation computer during the call; and
   in response to receiving the second input, modifying a second consent indicator data element during the call to reflect revocation of consent in regard to the second telephone number associated with the party.

2. The method of claim 1, wherein the second telephone number comprises a wireless telephone number.

3. The method of claim 1, further comprising:
   presenting consent status information related to the wireless telephone number during the call to the agent on the workstation computer in response to receiving the indication of the selection of the manage-consent icon from the workstation computer.

4. The method of claim 1, wherein the consent indicator data element further comprises consent related information associated with the second telephone number associated with the party.

5. The method of claim 1, wherein establishing the call to the wireless telephone number from the call handler uses a predictive dialer to originate the call.

6. The method of claim 1, further comprising:
   modifying a consent indication in the consent indicator data element during the call to reflect the revocation of consent for originating text calls to the wireless telephone number.

7. A non-transitory computer readable medium storing instructions that when executed by a processor cause the processor to:
   select a call record comprising a wireless telephone number associated with a party;
   determine a consent indicator data element associated with the wireless telephone number reflects consent from the party to call the wireless telephone number;
   establish a call to the wireless telephone number based on the consent indicator data element reflecting consent from the party;
   connect an agent in a contact center to the call;
   receive an indication during the call from a workstation computer used by the agent in the contact center, the indication reflecting the agent selecting a manage-consent icon displayed on the workstation computer, the indication provided in response to the party verbally indicating to the agent a revocation of consent to initiate future calls to the party;
   modify the consent indication data element in the call record associated with the wireless telephone number during the call reflecting the revocation of consent of the party in response to receiving the indication;
   retrieve during the call one or more other telephone numbers in the call record along with corresponding one or more consent indication data elements associated with the party; and
   display to the agent on the workstation computer the one or more other telephone numbers and corresponding consent status information for an indicated channel type during the call with the wireless telephone number in response to receiving the indication during the call.

8. The non-transitory computer readable medium of claim 7, wherein the instructions when executed further cause the processor to:
   select a second call record comprising a second wireless telephone number after modifying the consent indication data element in the call record;
   determine a second consent indicator data element associated with the second wireless telephone number reflects no consent from the party to call the second wireless telephone number; and
   not originating a second call to the second wireless telephone number based on the second consent indicator data element reflecting no consent from the party to call the second wireless telephone number.

9. The non-transitory computer readable medium of claim 7, wherein the instructions when executed further cause the processor to:
   display the indicated channel type during the call to the agent on the workstation computer as a voice channel type.

10. The non-transitory computer readable medium of claim 7, where the instructions when executed further cause the processor to:

modify the corresponding status information to reflect revocation of consent to initiate future calls to the party for the indicated channel type.

11. The non-transitory computer readable medium of claim 7, where the instructions when executed further cause the processor to:
process a second input at the workstation computer during the call, the second input indicating the revocation of consent should be associated with at least one of the one or more other telephone number associated with the party; and
in response to receiving the second input, modifying a corresponding consent indication data element reflecting the revocation of consent in regard to the at least one of the one or more other telephone numbers associated with the party.

12. The non-transitory computer readable medium of claim 11, where the instructions when executed further cause the processor to:
cause the at least one of the one or more other telephone numbers and a corresponding modified consent indication to be displayed to the agent using the workstation computer during the call.

13. The non-transitory computer readable medium of claim 7, wherein modifying the consent indication in the call record reflecting the revocation of consent in regard to the wireless telephone number further reflects the revocation of consent for text calls to the wireless telephone number.

14. A system for facilitating an agent in a call center managing consent for a party on a voice call with the agent using a workstation computer, comprising:
a call handler comprising a first processor configured to:
retrieve a call record comprising a wireless number and an associated consent indicator data element associated with the wireless number;
determine the consent indicator data element reflects consent to originate the voice call to the party using the wireless number;
cause the workstation computer to display a name of the party and the wireless number to the agent;
originate the voice call to the wireless number based on the consent indicator data element reflecting consent;
connect the agent to the voice call, wherein the agent is using the workstation computer, wherein the wireless number is displayed after the agent is connected to the voice call;
receive an indication during the call from the workstation computer as a result of the agent selecting a manage-consent icon displayed to the agent, wherein the manage-consent icon is selected by the agent after receiving a verbal request from the party to revoke consent for future calls to the party,
update the consent indicator data element during the call in response to receiving the indication to reflect revocation of consent by the party to receive future calls to the party, and
cause at least one other telephone number associated with the party and a corresponding modified consent indication to be displayed with the wireless number during the call to the agent using the workstation computer; and
the workstation computer, comprising a second processor configured to:
display the manage-consent icon to the agent during the call,
send the indication to the call handler during the call as a result of the manage-consent icon selected by the agent, and
display during the call the at least one other telephone number and the corresponding modified consent indication.

15. The system of claim 14, wherein the first processor in the call handler is further configured to:
receive a second indication from the workstation computer during the call to revoke consent for the at least one other telephone number; and
modify a corresponding consent indicator data element associated with the at least one other telephone number to reflect that consent has been revoked.

16. The system of claim 14 wherein the first processor in the call handler is further configured to:
update the consent indication data element associated with the party during the call reflecting revocation of consent to receive future calls comprising text calls to the party.

17. The system of claim 14, wherein the first processor in the call handler is configured to originate the call to the party by predictively dialing the call using the wireless number.

18. The system of claim 14, wherein the first processor in the call handler is further configured to:
receive a second indication from the workstation computer during the call to add a second telephone number associated with the party for which consent is granted by the party; and
receive the second telephone number associated with the party during the call wherein a second consent indicator data element reflects that consent is granted to receive calls using the second telephone number.

* * * * *